(12) United States Patent
    Panje et al.

(10) Patent No.: US 10,567,812 B2
(45) Date of Patent: *Feb. 18, 2020

(54) METHOD AND APPARATUS FOR STREAMING MULTIMEDIA DATA WITH ACCESS POINT POSITIONING INFORMATION

(71) Applicant: GOOGLE TECHNOLOGY HOLDINGS LLC, Mountain View, CA (US)

(72) Inventors: Krishna Prasad Panje, Bangalore (IN); Christopher S. Del Sordo, Souderton, PA (US); Sundar Murthy Tumuluru, Bangalore (IN)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/785,602

(22) Filed: Oct. 17, 2017

(65) Prior Publication Data
    US 2018/0041787 A1    Feb. 8, 2018

Related U.S. Application Data

(63) Continuation of application No. 13/593,680, filed on Aug. 24, 2012, now Pat. No. 9,813,740.

(51) Int. Cl.
    *G06F 15/16*      (2006.01)
    *H04N 21/2343*    (2011.01)
    *H04N 21/262*     (2011.01)
    *H04N 21/442*     (2011.01)
    *H04N 21/845*     (2011.01)

(52) U.S. Cl.
    CPC ............... *H04N 21/234363* (2013.01); *H04N 21/23439* (2013.01); *H04N 21/26258* (2013.01); *H04N 21/44209* (2013.01); *H04N 21/8456* (2013.01)

(58) Field of Classification Search
    CPC .......... H04L 29/06027; H04L 65/4084; H04L 67/101; H04L 67/1012; H04L 65/607
    USPC ................................. 709/217, 219, 230, 231
    See application file for complete search history.

*Primary Examiner* — Wing F Chan
*Assistant Examiner* — Andrew Woo
(74) *Attorney, Agent, or Firm* — Young Basile Hanlon & MacFarlane, P.C.

(57) ABSTRACT

A method includes downloading a playlist file for a multimedia presentation over a network from a streaming server using a transfer protocol, the playlist file including an ordered list of URIs for a plurality of media files, each of the plurality of media files including compressed video data corresponding to a segment of the multimedia presentation and containing reference frames; downloading a data file that includes reference frame information indicating a location of the reference frame in the media file; performing a trick play related to a displaying of the multimedia presentation; selecting, from a plurality of variant streams, a first variant stream for use in displaying the multimedia presentation; and reassembling segments included in media files associated with a first variant stream of the plurality of variant streams to play the multimedia presentation as a continuous stream.

20 Claims, 8 Drawing Sheets

PLAYLIST FILE

```
#EXTM3U
#EXT-X-TARGETDURATION:20
#EXT-X-VERSION:3
#EXT-X-MEDIA-SEQUNCE:1
#EXTINF:20,
HTTPS://EXAMPLE.COM/11_SOME_NAME.TS        —202
#EXTINF:20,
HTTPS://EXAMPLE.COM/22_SOME_NAME.TS        —204
#EXTINF:20,
HTTPS://EXAMPLE.COM/33_SOME_NAME.TS        —206
#EXTINF:20,
HTTPS://EXAMPLE.COM/44_SOME_NAME.TS        —208
```

VARIANT PLAYLIST FILE        *210*

```
#EXTM3U
#EXT-X-STREAM-INF:PROGRAM-ID=1, BANDWIDTH=120000,RESOLUTION=640x480
HTTP://EXAMPLE.COM/BASE/PL1.M3U8— 212
#EXT-X-STREAM-INF:PROGRAM-ID=1, BANDWIDTH=150000,RESOLUTION=854x480
HTTP://EXAMPLE.COM/MAIN/PL1.M3U8— 214
#EXT-X-STREAM-INF:PROGRAM-ID=1,BANDWIDTH=450000,RESOLUTION=1920x1080
HTTP://EXAMPLE.COM/HIGH/PL1.M3U8— 216
#EXT_X_REF_DATA:PROGRAM-ID=1,BANDWIDTH=120000,RESOLUTION=640x480
HTTP://EXAMPLE.COM/BASE/IRFAP/PL1.M3U8— 222
#EXT_X_REF_DATA:PROGRAM-ID=1,BANDWIDTH=150000,RESOLUTION=854x480
HTTP://EXAMPLE.COM/MAIN/IRFAP/PL1.M3U8 — 224
#EXT_X_REF_DATA:PROGRAM-ID=1,BANDWIDTH=450000,RESOLUTION=1920x1080
HTTP://EXAMPLE.COM/HIGH/IRFAP/PL1.M3U8 — 226
```

FIG.3

HELPER DATA FILE                                                              /220

11_SOME_NAME.TS; 1 SEC GRANULARITY

1ST REFERENCE OFFSET; SIZE_OF_IDR_FRAME FOR 1ST REFERENCE; TIMESTAMP FOR 1ST REFERENCE;

2ND REFERENCE OFFSET; SIZE_OF_IDR_FRAME FOR 2ND REFERENCE; TIMESTAMP FOR 2ND REFERENCE;

. .

nTH REFERENCE OFFSET; SIZE_OF_IDR_FRAME FOR nTH REFERENCE; TIMESTAMP FOR nTH REFERENCE;

22_SOME_NAME.TS; 1 SEC GRANULARITY

1ST REFERENCE OFFSET; SIZE_OF_IDR_FRAME OF 1ST REFERENCE; TIMESTAMP FOR 1ST REFERENCE;

2ND REFERENCE OFFSET; SIZE_OF_IDR_FRAME FOR 2ND REFERENCE; TIMESTAMP FOR 2ND REFERENCE;

. .

nTH REFERENCE OFFSET; SIZE_OF_IDR_FRAME FOR nTH REFERENCE; TIMESTAMP FOR nTH REFERENCE;

33_SOME_NAME.TS; 1 SEC GRANULARITY

1ST REFERENCE OFFSET; SIZE_OF_IDR_FRAME OF 1ST REFERENCE; TIMESTAMP FOR 1ST REFERENCE;

2ND REFERENCE OFFSET; SIZE_OF_IDR_FRAME FOR 2ND REFERENCE; TIMESTAMP FOR 2ND REFERENCE;

nTH REFERENCE OFFSET; SIZE_OF_IDR_FRAME FOR nTH REFERENCE; TIMESTAMP FOR nTH REFERENCE;

44_SOME_NAME.TS; 1 SEC GRANULARITY

1ST REFERENCE OFFSET; SIZE_OF_IDR_FRAME OF 1ST REFERENCE; TIMESTAMP FOR 1ST REFERENCE;

2ND REFERENCE OFFSET; SIZE_OF_IDR_FRAME FOR 2ND REFERENCE; TIMESTAMP FOR 2ND REFERENCE;

. . .

nTH REFERENCE OFFSET; SIZE_OF_IDR_FRAME FOR nTH REFERENCE; TIMESTAMP FOR nTH REFERENCE;

FIG.7

METHOD AND APPARATUS FOR STREAMING MULTIMEDIA DATA WITH ACCESS POINT POSITIONING INFORMATION

CROSS REFERENCE TO RELATED APPLICATIONS

This application is a continuation of U.S. Utility application Ser. No. 13/593,680, filed Aug. 24, 2012, the contents of which is hereby incorporated by reference in their entirety.

BACKGROUND

Streaming is a technique of delivering data corresponding to a multimedia presentation or other media content to end-users and can involve continuously playing media content, video and/or audio, while media data is being streamed or delivered to the user. One particular form of streaming is known as Hypertext Transfer Protocol (HTTP) Live Streaming (HLS) and provides a technique for streaming content using HTTP. As merely one example, the streamed content can correspond to video and/or audio currently being broadcast on a television channel (i.e., so-called live TV). Thus, an end user may watch live streaming content on television monitors connected to IP client set-top boxes as well as other IP client devices such as tablets, smartphones, laptop computers and the like.

In HLS, incoming media data from a source is segmented or "chunked" into multiple media files which are stored on a HLS streaming server. A playlist file is created that includes Uniform Resource Identifiers (URLs) that direct HLS client devices to the media files on the streaming server. When the segmented media files are reassembled and played one-by-one by the HLS client device in accordance with order specified in the playlist file, the user of the client device can be provided, for instance, with a continuous and uninterrupted broadcast of a real-time, near real-time, or "live" event or broadcast. Of course, pre-recorded and/or pre-existing content can be streamed in a similar manner.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 2 is an example of a playlist file in accordance with an embodiment.

FIG. 3 is an example of a variant playlist file having links to helper data files in accordance with an embodiment.

FIG. 7 is an example of a helper data file providing access point information in accordance with an embodiment.

DETAILED DESCRIPTION

Figure 1:
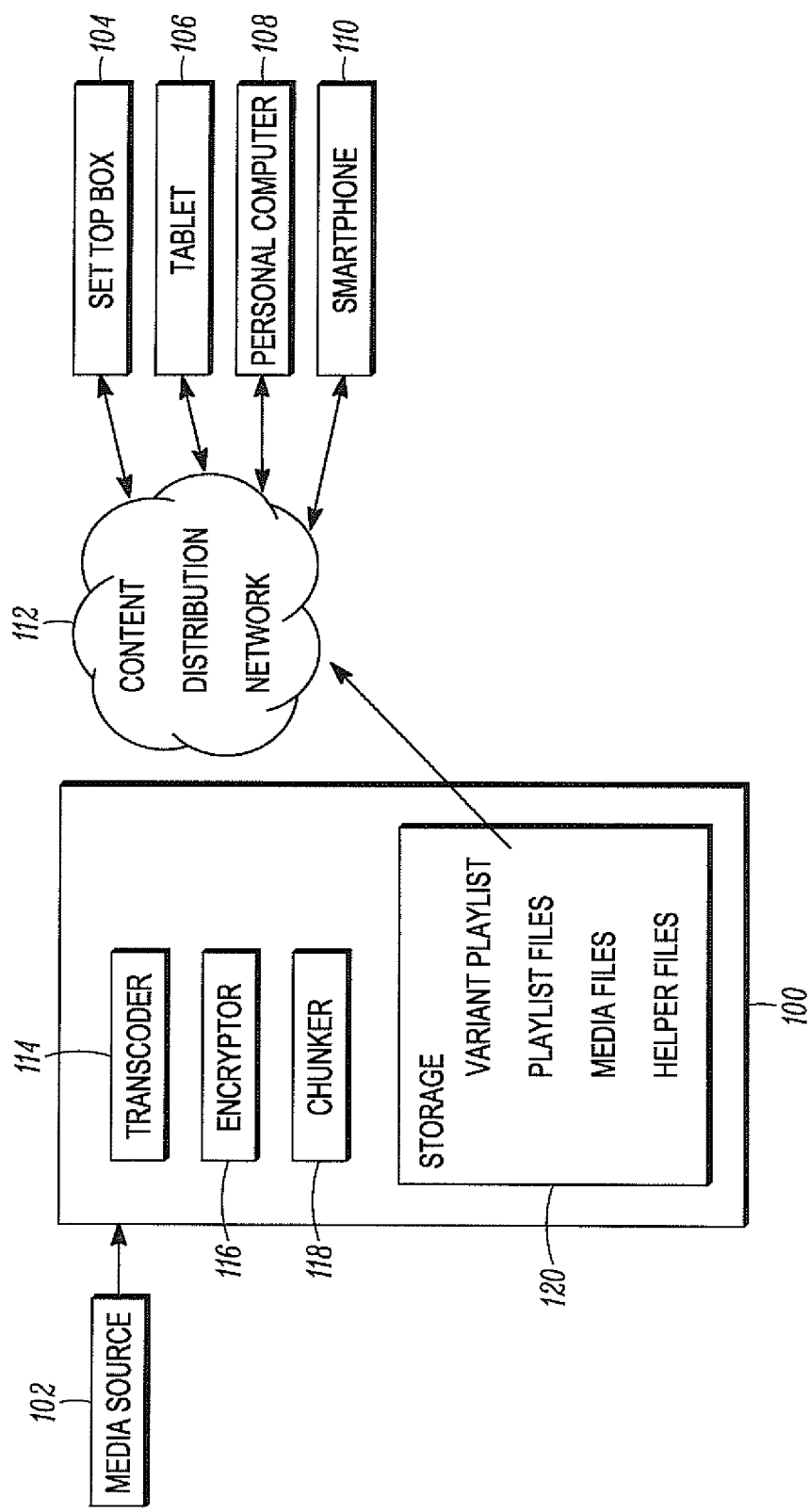
FIG. 1 is a diagram of a network over which content can be streamed from a streaming server to a client device in accordance with an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A conventional HLS streaming server typically creates multiple variant streams of different bit rates and/or image resolutions for the same content thereby enabling HLS client devices to switch playlist files during playback based on available network bandwidth for delivery of the media files from the streaming server to the client device. Accordingly, for each content or program, the server maintains different playlists with different bit rates for different image resolutions (a major component of image quality).

A conventional HLS client device can download all or selected ones of the playlist files from the streaming server, determine available network bandwidth, and then select media files for download from an appropriate playlist. The HLS client device plays the media files one by one and may periodically monitor bandwidth, switch between variant streams as needed, and download and play appropriate media files.

In addition to switching between variant streams, "trick play" operations may be desired by a user of a HLS client device. Fast forward, fast reverse, and seek provide examples of trick plays and require relatively fast repositioning within the stream of data which includes data within media files yet to be downloaded or not currently possessed by the HLS client device. Switching may also entail jumping from one representation chunk (i.e., a first chunk) to another representation chunk (i.e., a second chunk) while the first chunk is not fully played and/or has not been fully downloaded by the client device.

Seeking to the middle or an intermediate point within a media file requires a conventional HLS client device to locate reference frames within compressed video data. Thus, a conventional HLS client device needs to have the capability of locating reference frames should trick plays or switching between variant streams at an intermediate point in a media file be supported by the HLS client device. Such tasks are typically time consuming and resource consuming and require the HLS client device to analyze entire media files for variant streams and calculate/determine the position of each of the desired reference frames within the media file or a set of media files. This also necessarily requires the HLS client device to download, store and analyze the entire files or chunks of data for at least one, and possibly all, the media files within a playlist. Such HTTP downloading can lead to sluggishness, particularly in low bandwidth situations, and user experience may be compromised. Accordingly, switching between variant streams is typically performed only at the beginning of a new or the next media file, and trick play operations, such as fast forward and seek, are typically not supported by conventional HLS client devices.

According to embodiments disclosed herein, apparatus and methods for streaming multimedia data over a network are provided such that a client device is able to readily perform trick plays and to switch and stitch between variant streams at intermediate points within media files.

According to one such embodiment, a method is provided in which at least one playlist file for a selected multimedia presentation is downloaded by a client device over the network from a streaming server using a transfer protocol. The at least one playlist file provides an ordered list of Universal Resource Indicators (URLs) for a plurality of media files each providing compressed video data corresponding to a segment of the multimedia presentation. The compressed video data includes reference frames used for video compression. In addition, at least one data file that is associated with the at least one playlist file is downloaded by the client device over the network from the streaming server using a transfer protocol and provides information identifying a location, a size, and a time stamp for each reference frame contained in the plurality of media files listed in the at least one playlist file.

According to another aspect of this embodiment, a method is provided in which at least one playlist file for a selected multimedia presentation is provided by a streaming server for download by a client device over the network with a transfer protocol. The at least one playlist file identifies an ordered list of Universal Resource Indicators (URLs) for media files which each provide a different segment of multimedia data of the selected multimedia presentation. Each media file provides compressed video including reference frames. In addition, at least one data file is generated by the streaming server for download by a client device over the network with a transfer protocol. The at least one data file identifies a location, a size, and a time stamp for each of the reference frames contained in the compressed video of the media files.

According to another aspect of this embodiment, a client device is provided for processing multimedia data streamed over a network. The client device has at least one processing unit configured to download at least one playlist file for a selected multimedia presentation over the network from a streaming server using a transfer protocol. The at least one playlist file provides an ordered list of Universal Resource Indicators (URLs) for a plurality of media files each providing compressed video data corresponding to a segment of the multimedia presentation and containing reference frames. The at least one processing unit is also configured to download at least one data file that is associated with the at least one playlist file and that provides information identifying a location, a size, and a time stamp for each of the reference frames contained in the plurality of media files listed in the at least one playlist file.

According to another aspect of this embodiment, a server for streaming multimedia data over a network is provided. The server has at least one processing unit configured to provide at least one playlist file for a selected multimedia presentation for download by a population of client devices over the network with a transfer protocol. The at least one playlist file identifies an ordered list of Universal Resource Indicators (URLs) for media files each providing a different segment of multimedia data of the selected multimedia presentation. The at least one processing unit is also configured to generate at least one data file for download by the population of client devices over the network with a transfer protocol. The at least one data file identifies a location, a size and a time stamp for each reference frame contained in compressed video data of the media files.

A streaming server or like equipment or set of equipment may be located or connected anywhere on a network. Likewise, a client device can be located anywhere and is connected to the network for communicating with the streaming server. FIG. 1 provides an example of such an arrangement. In this example, a streaming server 100 receives media content from a source 102 and makes the media content available to various different types of client devices 104, 106, 108 and 110 via a content distribution network 112.

Examples of client devices include any electronic device that can communicate with the streaming server 100 and be used in connection with the playing of video and/or audio digital media data. For instance, client devices can include set-top boxes 104, televisions, personal or laptop computers 108, tablets 106, smartphones 110, wireless devices, and other portable or non-portable devices having display screens and/or audio speakers and/or adapted to output signals to other devices having display screens and/or audio speakers.

It will be understood by a person having ordinary skill in the art that the conventional term "set-top box" should not be construed to limit the physical placement or configuration of such a device; for example, a set-top box 104 is not limited to a device that is enclosed in a box, nor is it limited to a device positioned on top of a television set.

Simply for purposes of example, the network 112 can be any network that provides Internet connectivity, and communications can be provided directly over the Internet. However, according to an alternate embodiment, the network may be a network provided by a service provider such as a provider of terrestrial, cable or satellite digital TV. For instance, the network 112 may be a hybrid fiber-coax cable (HFC) network interconnecting a streaming server via a headend of the network and a set-top box or like consumer premise equipment located at a home or other location of a subscriber. In this example, the set-top box 104 may function as a client device for purposes of handling streaming and performing fetches of playlist files and media files from the streaming server 100. The set-top box 104 may output the streamed content for display on a connected monitor or may forward the content to other client devices including tablets 106, personal or laptop computers 108, smartphones 110, and the like that may be connected to a home or local area network to which the set-top box 104 is connected.

As a further alternative, the set-top box 104 or other customer premise equipment may function in some aspects as a streaming server and make playlists and media files available to other client devices 106, 108 and 110 connected to the home or local area network. Of course, the use of set-top boxes, customer premises equipment, and home and cable networks are merely provided for purposes of example, and the embodiments disclosed herein are not limited to such networks and devices.

In use, the streaming server 100 obtains a multimedia presentation or the like in any form from an external source 102. The multimedia presentation may first be subject to a transcoding process in the transcoder 114 whereby a single input stream is turned into a bouquet of streams, each encoded into a different resolution format and bit rate. The term "bouquet" as used herein refers to a collection of related streams, each constituting a unique bit rate and resolution pairing derived from the same original MPEG service. The multiplicity of different stream formats and bit rates enables the content to be sourced to devices with different capabilities, such as smartphone 110, personal computer 108, tablet 106, and set-top box 104 which may be connected to a relatively large high definition television screen or the like. In addition, the different bit rates support adaptive streaming, whereby the receiving client has the ability to measure network congestion and request a lower or higher bit rate stream from the source. This can eliminate visual impairments caused by network congestion (e.g. macro-blocking due to dropped packets, frozen frames) at the expense of higher resolution video.

After transcoding, the bouquet of streams may be encrypted in an encryptor 116 or pre-encryptor and then chunked into segments in a chunker 118. The chunking process breaks each stream into time slices (e.g. 10 second period, 20 second period, or the like) and places the stream of packets for that period into a standard file format container that includes the packets and metadata describing the content. The files are placed in storage 120 on the server 100 which can then publish the files via the content distribution network 112 for distribution to the edges of the network (i.e., to smartphone 110, personal computer 108, tablet 106, set-top box 104, and like customer devices or customer premise equipment). The client devices 104, 106, 108 and 110 may pull or fetch the files over the network 112 by the use of standard unicast HTTP Gets or fetches. The adaptive client devices continuously measure network performance and can adaptively request other file chunks containing higher or lower bit rate streams depending on the dynamic bandwidth that the network 112 can support.

Accordingly, the streaming server 100 segments the media data into chunks and stores the chunks in multiple media files that are in a form that may be transferred one-by-one or made available, for instance, via HTTP or other transfer protocol, to any of a population of client devices. In addition, the streaming server 100 also creates a playlist file or manifest corresponding to the segmented media files so that the stream of data can be readily reassembled by client devices after download.

Each playlist file can provide an ordered list of tags or URIs with each URI in the playlist file identifying a media file that is a segment of a stream, which may be a single contiguous stream of media data for a particular program, content, or multimedia presentation. The playlist files may be, for example, Extended M3U Playlist files. M3U refers to Moving Picture Experts Group Audio Layer 3 Uniform Resource Locator (MP3 URL) and is a format used to store multimedia playlists. The M3U file is a text file that contains the locations of one or more media files.

FIG. 2 provides an example of a playlist file 200 that can be given a filename PL1.m3u8. The playlist file 200 includes tags or addresses for media files. In the example provided in FIG. 2, tags 202, 204, 206 and 208 are provided for media files 1_some_name.ts, 22_some_name.ts, 33_some_name.ts, and 44_some_name.ts, respectively. Play duration of media contained in each media file listed in playlist file 200 is 20 seconds.

As discussed above, a plurality of playlist files similar to playlist file 200 can be created and/or stored on the streaming server 100 and made available for download by client devices for a particular content. Each playlist file and associated set of media files provides a variant stream with a different combination of bit rate and video image resolution (i.e. stream profile). Table 1 provides examples of different available profiles of variant streams that may be available for a particular content. In this particular example, there are nineteen variant streams in total.

TABLE 1

| Profile # | Stream | Container | Codec | Type | Resolution | FPS | Bit Rate |
|---|---|---|---|---|---|---|---|
| 1 | SPTS | MPEG2-TS | AVC | High 4.1 | 1920 × 1080 | 29.97 | 6.750 |
| 2 | SFTS | MPEG2-TS | AVC | High 4.1 | 1920 × 1080 | 29.97 | 4.500 |
| 3 | SPTS | MPEG2-TS | AVC | High 4.1 | 1920 × 1080 | 29.97 | 3.000 |
| 4 | SFTS | MPEG2-TS | AVC | High 4.1 | 1280 × 720 | 29.97 | 4.125 |
| 5 | SPTS | MPEG2-TS | AVC | High 4.1 | 1280 × 720 | 29.97 | 2.750 |
| 6 | SFTS | MPEG2-TS | AVC | Main 3.0 | 1280 × 720 | 29.97 | 2.500 |
| 7 | SPTS | MPEG2-TS | AVC | Main 3.0 | 854 × 480 | 29.97 | 1.500 |
| 8 | SFTS | MPEG2-TS | AVC | Main 3.0 | 854 × 480 | 29.97 | 1.000 |
| 9 | SPTS | MPEG2-TS | AVC | Main 3.0 | 640 × 360 | 29.97 | 0.600 |
| 10 | SPTS | MPEG2-TS | AVC | Main 3.0 | 416 × 240 | 29.97 | 0.250 |
| 11 | SPTS | MFEG2-TS | AVC | Main 3.0 | 640 × 480 | 29.97 | 1.250 |
| 12 | SPTS | MPEG2-TS | AVC | Main 3.0 | 640 × 480 | 29.97 | 0.900 |
| 13 | SPTS | MPEG2-TS | AVC | Main 3.0 | 480 × 360 | 29.97 | 0.500 |
| 14 | SPTS | MPEG2-TS | AVC | Main 3.0 | 320 × 240 | 29.97 | 0.250 |
| 15 | SPTS | MPEG2-TS | AVC | Base 3.0 | 848 × 480 | 29.97 | 0.700 |
| 16 | SPTS | MPEG2-TS | AVC | Base 3.0 | 640 × 480 | 29.97 | 1.200 |
| 17 | SPTS | MPEG2-TS | AVC | Base 3.0 | 640 × 480 | 29.97 | 0.900 |
| 18 | SPTS | MPEG2-TS | AVC | Base 3.0 | 480 × 320 | 29.97 | 0.900 |
| 19 | SPTS | MPEG2-TS | AVC | Base 3.0 | 480 × 320 | 29.97 | 0.600 |

Thus, in the example provided by Table 1, a total of 19 different playlists may be available for download from the streaming server for a particular or selected multimedia presentation. Each is provided as a single program transport stream in the form of MPEG2-TS and is AVC encoded. The type of each profile is one of High 4.1, Main 3.0, of Base 3.0, the video image resolutions are form 320×240 to 1920× 1080, and the frames per second (FPS) are 29.97 for each. Most importantly, each is provided of a different combination of bit rate and resolution. The bit rates shown in the table range from 0.250 to 6.750. The client device determines which or how many profiles to download depending upon available bandwidth conditions and, in some cases, playback capability of the device or connected devices.

The streaming server 100 also creates and makes available a variant stream playlist file that lists each variant stream profile (i.e., nineteen for the example provided by Table 1). Thus, the streaming server may permit downloading of the information provided in Table 1 by a client device interested in streaming the content associated with Table 1. As another example, FIG. 3 provides a variant playlist file 210 including three URL tags 212, 214 and 216 providing address information corresponding to three playlist files (i.e., corresponding to base, main and, high variant stream profiles).

In addition to creating media files, playlist files, variant streams (media files and playlist) for the content at different combinations of bit rate and resolution, and a variant stream playlist file, the streaming server 100 also creates helper data files 220 for aiding client devices 104, 106, 108 and 110 in locating desired positions or access points of data within the media files. The helper data files 220 assist client devices in quickly determining access point locations or positions (referred to herein as Independent Reference Frame Access Points (IRFAP)) within the data contained by media files without time consuming downloading and analysis of entire media files and/or sets of media files. One helper data file 220 can be generated and made available for download for each variant stream profile provided by the streaming server 100.

As an alternative to the streaming server 100 providing the IRFAP information, the helper data file 220 containing the IRFAP information can be generated for instance, by the set-top box 104 or other customer premise equipment on the home network for use by other client devices 106, 108 and 110 on the home network. In this regard, the set-top box 104 or other customer premises equipment could provide functions similar in at least some respects to the streaming server 100 discussed above.

In video compression, an !-frame refers to an "Intra-coded picture" and is in effect a fully specified picture similar to a conventional static image file. Thus, unlike other frames used in video compression, I-frames are coded without reference to any other frame. An Instantaneous Decoder Refresh (IDR) frame is a special kind ofl-frame used in MPEG-4 AVC encoding. Any frame following an IDR frame cannot refer back to frames preceding the IDR frame.

Figure 4:
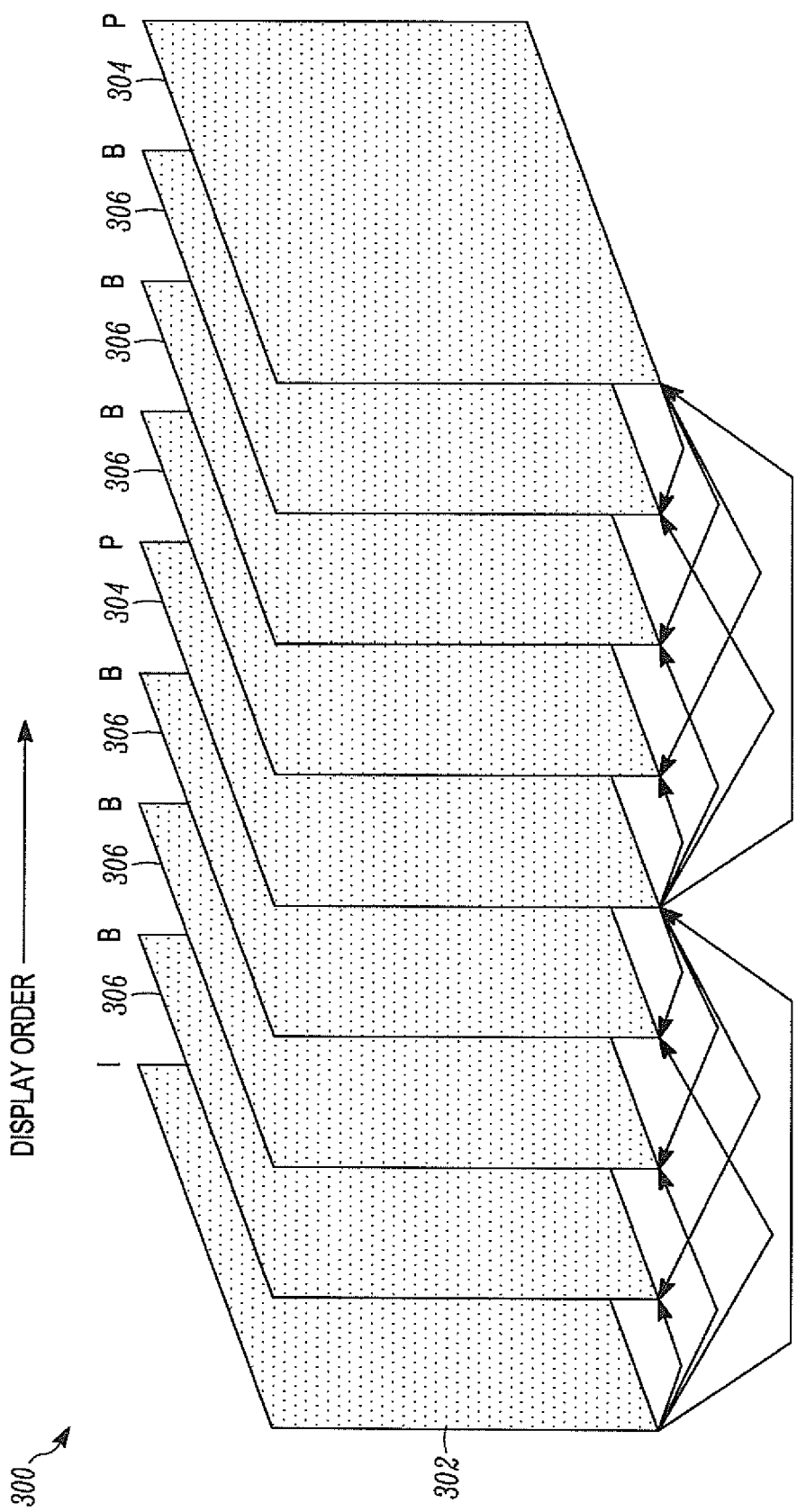
FIG. 4 is a diagram of a series of consecutive frames of video including an IDR reference frame in accordance with an embodiment.

By way of example, FIG. 4 is a diagram showing a series 300 of consecutive frames of video. As discussed above, the !-frame 302 (which is also an IDR frame) is encoded without reference to other frames. In contrast, the P-frames 304 are encoded with reference to other earlier I and P frames in display order and the B-frames 306 are encoded with reference to other earlier or later I and P frames in display order.

The helper data file 220 provides a client device with information of the location of reference IDR frames, such as IDR frame 302 in FIG. 4, within the compressed video data provided by media files for a particular stream profile. Accordingly, the client device is not required to analyze media files for this information; rather, such information can be readily downloaded in an efficient manner by the client device.

Further, switching between variant streams at an intermediate point during the play duration of a media file requires a client device to have information of Presentation Time Stamp (PTS) aligned reference frames within each media file. A PTS is a metadata field in a MPEG transport or program stream used to achieve synchronization of separate elementary streams (for example, video, audio, subtitles, etc.). Thus, the helper data file 220 also provides PTS information for each IDR frame.

Accordingly, the helper data file 220 associated with a particular variant stream or profile contains: (i) position entries for independent reference frames in the associated set of media files; (ii) a size of each reference frame; and (iii) a time stamp of each reference frame. Thus, for every variant stream, there is an associated helper or IRFAP data file and a tag URI entry for that data file provided, for instance, in the variant stream playlist. For instance, see the tags 222, 224 and 226 in the variant playlist file 210 shown in FIG. 3.

Figure 5:
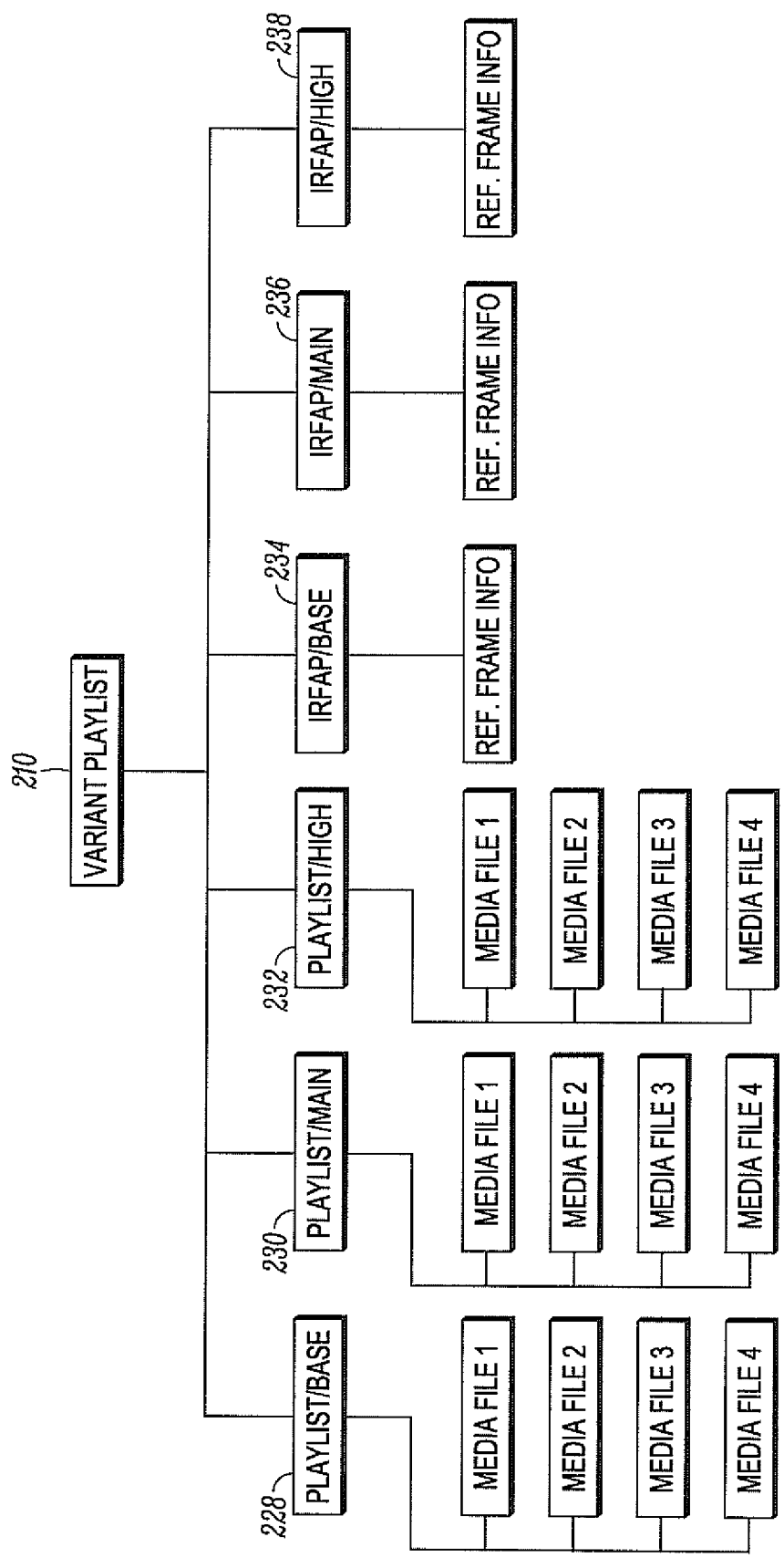
FIG. 5 is a diagram showing the information accessible from a variant playlist file in accordance with an embodiment.

The relationship among the various files discussed above is best shown in the tree-style diagram of FIG. 5. For instance, the variant playlist file 210 contains tags or address information for three playlist files 228 (base profile), 230 (main profile), and 232 (high profile) and tags for three helper data files 234, 236 and 238 corresponding to the playlist files 228, 230 and 232, respectively. Each of the playlist files, 228, 230 and 232, contains addresses to media file 1, media file 2, media file 3 and media file 4, and each of the helper data files, 234, 236 and 238 provide reference frame location, size and time stamp information for a corresponding one of the playlist files (base, main and high).

In response to a download request from the client device 104, 106, 108 or 110, the streaming server 100 may transmit the variant stream playlist file 210 thereby providing the client device with tags or UR is for each playlist file 228, 230 and 232 and each helper data file 234, 236 and 238. The streaming server 100 enables downloading and reloading of such files which can be transferred over the network 112 via a transfer protocol, such as HTTP, to the client device.

The client device 104, 106, 108 or 110 uses the tags to the playlist files to access and download selected playlist files from the streaming server 100 for a selected multimedia presentation for one or more particular variant streams or profiles and obtains and plays media data files indicated by a selected playlist file. The client device may dynamically and repeatedly reload the playlist file to discover additional and/or different media segments. The client device may include memory (e.g. flash memory or DRAM, etc.) to act as a buffer to store the media files as they are received. The buffer can provide many seconds or more worth of presentable content beyond the time of content currently being presented so that the buffered content can later be displayed while new content is being downloaded. The buffer can provide presentable content while the client device is attempting to retrieve content through an intermittently slow network connection and hence, to some extent, can hide network latency or connection issues.

For purposes of readily and quickly locating access points or points of interest within a stream of data, such as needed for performing trick plays or for switching to a different variant stream intermediate of a currently playing media file, the client device 104, 106, 108 or 110 may download the helper data file 220 associated with a desired variant stream from the streaming server 100. By way of example, the client device may use the IRFAP information to quickly identify reference IDR frames within media files for a particular variant stream and can HTTP download the reference frame data only, apart from the remainder of the media data in the media files, based on information of the size and location of the reference frames in the media files. The IDR frames can be used for efficiently performing trick play operations such as fast forward from an indicated position. Data transfer is fast and presentation delay is minimized because only the IDR frames are downloaded by the client device and not the entire media file for some or all the media files identified in a playlist and the client device is not required to analyze the media files.

In a similar manner, the helper data file 220 can be used by the client device to efficiently stitch data streams together without interruption or loss of data when switching between one variant stream and another at an intermediate location during the playing of content provided by a media file. Here, the helper data file 220 provides information that locates IDR frames of two streams that provide common access points that can be aligned according to PTS across variant stream chunks.

Figure 6:
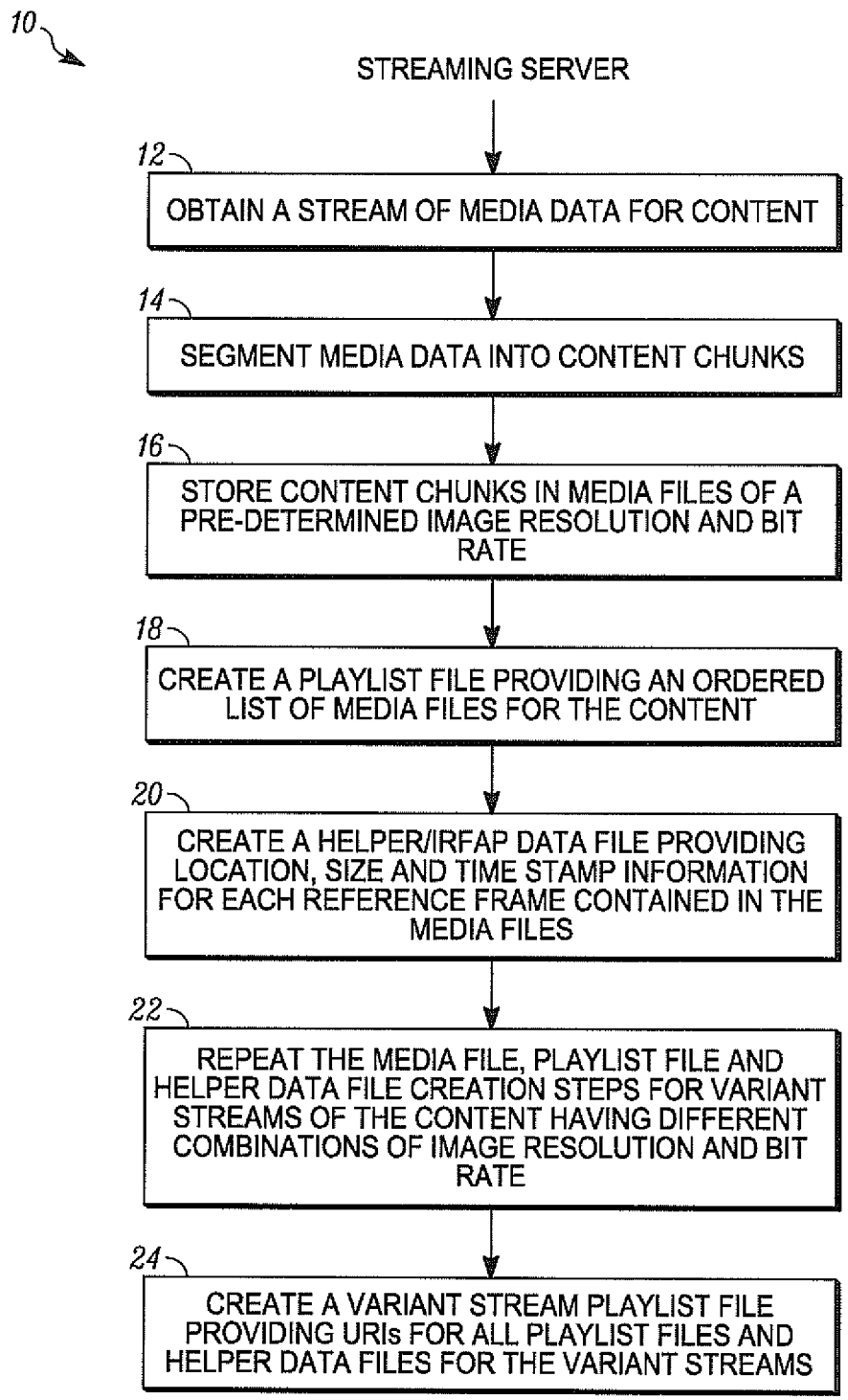
FIG. 6 is a flowchart of process steps relative to a streaming server for enabling ready positioning within a stream of multimedia data in accordance with an embodiment.

FIG. 6 provides a flowchart of a process 10 that can be performed by the streaming server 100. The streaming server 100 receives content for a particular multimedia presentation or content in step 12, segments the data into "chunks" in step 14, stores the chunks of media data at a pre-determined image resolution and bit rate in a plurality of media files in step 16, and creates at least one playlist file providing a URI for each media file in step 18. As an example of a playlist file, see the playlist file 200 in FIG. 2. Further, the streaming server (or another device acting at least partially as a streaming server) creates a helper or IRFAP data file 220 for the above referenced stream in step 20. As an example of a helper data file, see the helper data file 220 in FIG. 7.

The helper or IRFAP data file 220 provides reference frame locations for all content chunks (i.e., media files) identified in the play list file for a particular variant stream or profile. For example, the helper or IRFAP data file 220 may contain information as provided in FIG. 7 concerning filenames of each of the media files, granularity, offset of each of reference frame contained in each media file, size of each reference frame, and timestamp of each reference frame. In the example provided by FIG. 7, the media file filenames are the same as listed in the playlist file 200 shown in FIG. 2. Thus, for the media file "11_some_name.ts", the helper data file 220 identifies a 1st reference frame through an nth reference frame. The same is provided for media files "22_some_name.ts", "33_some_name.ts" and "44_some name.ts".

The reference frame offsets provided in helper data file 220 can be, for example, hex values determined from a beginning of a chunk or media file. Thus, the offset value provided can be used to determine the beginning of each IDR frame in each media file within a playlist for a particular variant stream. Since the size of the reference frame is known along with the location within a media file, a client device can efficiently request from the streaming server and/or download from the streaming server only a specified size of data from a specified location within a specified media file or media files. Accordingly, if the specified size corresponds to the sizes of the IDR frames, the downloaded data will include only the IDR frames and not all other frames of the content. In an embodiment, granularity can be defined in the helper data file. For instance, the helper data file in FIG. 7 sets granularity at one second. Thus, for a media file having play duration of 20 seconds, the one second granularity permits a maximum of twenty IDR frames to be identified in the helper data file. As an example, in the event that all frames of the media file are coded as IDR frames, each Independent Reference Frame Access Point can be added at an offset of a minimum predetermined time lapse to avoid helper data file size increase. Of course, media files may have any amount of play duration and the granularity setting can be set or adjusted to a different value and/or varied as desired.

The variant stream access point information provided by the helper data file 220 can be created and stored by the streaming server 100 and/or downloaded by a client device in the format indicated in Table 2. Of course, this is merely provided by way of example and can be provided in other formats.

TABLE 2

Variant Stream Access Point Information

| Element | Description | Size in bits |
| --- | --- | --- |
| Bandwidth | Current variant stream bandwidth (for purposes of crosscheck with corresponding variant stream bandwidth) | 32 |
| Begin Chunk | Start chunk (media file) number in current playlist | 32 |

TABLE 2-continued

Variant Stream Access Point Information

| Element | Description | Size in bits |
| --- | --- | --- |
| End Chunk | Last chunk (media file) number in current playlist. Total chunks in current playlist = (End Chunk − Begin chunk + 1) | 32 |
| Chunk Duration | Duration of each chunk (media file) in seconds. This is provided in form of an array. | Variable |
| Number of IRP (Independent Reference Points) | Total number of Independent Reference Points in current playlist for all the chunks. | 32 |
| IRP Info | Independent Reference point information. | Variable |

By way of further example, the IRP information identified in Table 2 can be provided in the format indicated in Table 3.

TABLE 3

Independent Reference Point information (IRP Info)

| Element | Description | Size in bits |
| --- | --- | --- |
| Chunk Number | Chunk (media file) number to which the Independent Reference Point belongs | 16 |
| Flags | Flags indicating status of the random access point | 16 |
| Presentation Timestamp (PTS) | Video presentation time stamp (PTS) of the video frame | 32 |
| Offset in chunk | Byte offset of the IDR video frame in Chunk (media file) | 32 |
| IDR Frame Size | IDR (reference) frame size | 32 |

The "Flags" (15-0 bits) identified in Table 3 can include a 0th bit (MSB) that is used to indicate whether PTS is aligned in all other variant streams. The 15-1 bits can be reserved for future use.

The streaming server 100 can define a new tag, for instance EXT_X_REF_DATA, and associates a URI that is included in the playlist file or a variant stream playlist file to enable a client device to download the helper data file for at least a series of chunks/media files for a particular variant stream (the URI indicated in the new tag will point to helper data file). For example, see the EXT_X_REF_DATA tags 222, 224 and 226 in the variant stream playlist file 210 in FIG. 3.

At step 22 in the flowchart of FIG. 6, the streaming server 100 can perform the above steps of storing media files with a pre-determined image resolution and at a pre-determined bit rate, create a playlist file, and create a helper data file for each variant stream at different desired bit rates and image resolution combinations, for instance, for each profile listed in Table 1. At step 24, the streaming server 100 can create a variant stream playlist file 210 including a tag or URI for each playlist file and for each helper data file of each playlist file as discussed above. Thus, each variant stream or profile has a tag for its playlist file and a tag for its associated helper data file.

Client devices that cannot use the helper data file, the IRFAP information, and the new tag can simply ignore such information and therefore will not be affected by the access point identification technique discussed above. Thus, compatibility issues should not be created. However, for client devices that can use the helper data file 220, a URI is furnished as a HLS play list tag, and the software of the client device manages reading the information for use, for instance, during trick plays to facilitate quick access/seek and/or during switching and stitching between variant streams at an intermediate location during play duration of a media file.

Figure 8:
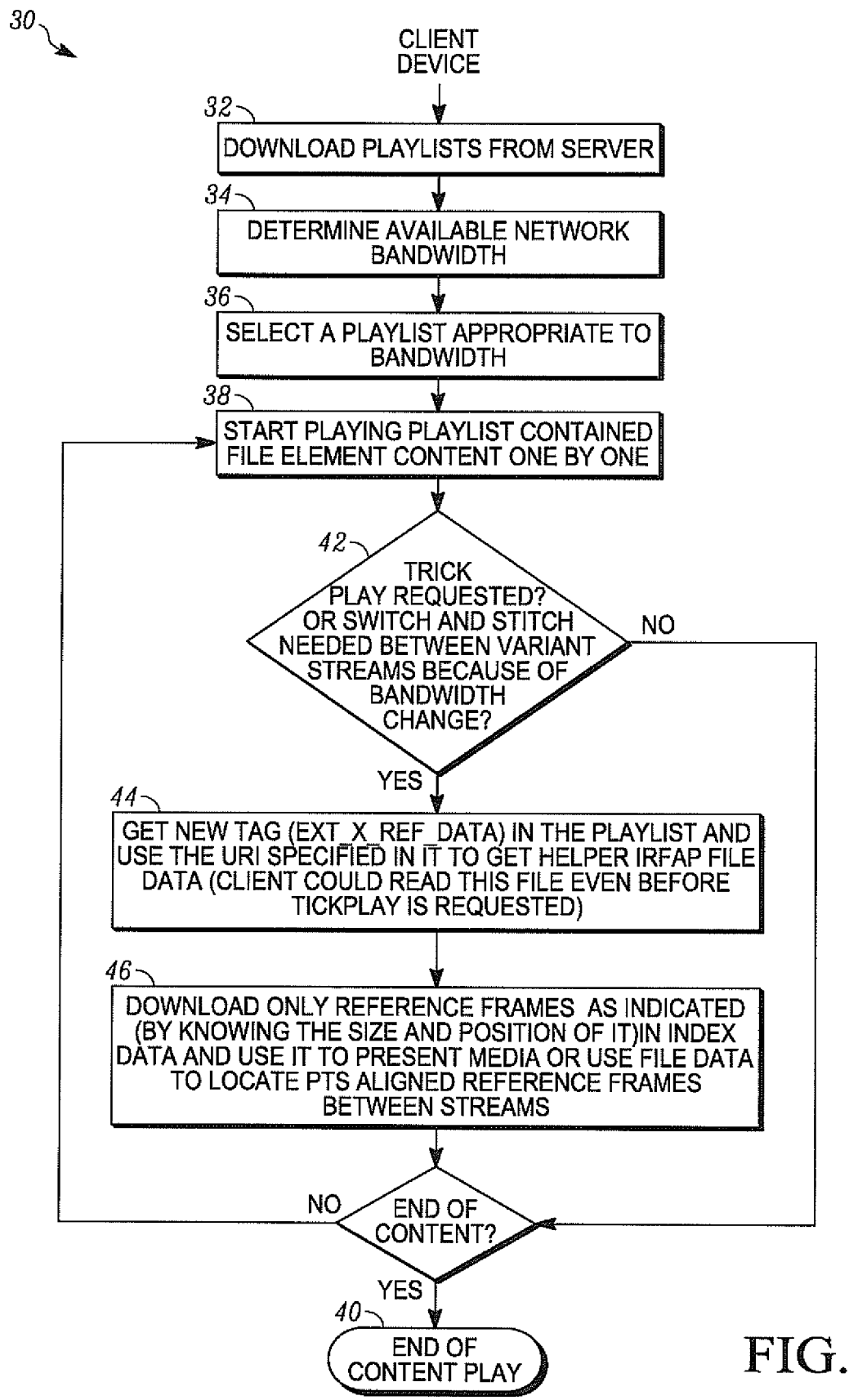
FIG. 8 is a flowchart of process steps relative to a client device for media positioning within a stream of multimedia data in accordance with an embodiment.

The process 30 performed by a client device is shown by the flowchart in FIG. 8. The client device downloads desired playlist files from the streaming server during step 32 and determines available network bandwidth during step 34. Thereafter, the client device selects an appropriate playlist file depending upon bandwidth in step 36. The client device begins downloading the media files listed by the selected playlist file and begins playing the downloaded media files one by one during step 38. Step 38 continues until the content has finished playing in step 40.

If a trick play is desired and/or if a switch and stitch operation to a different variant stream is needed, the client device in step 42 obtains the EXT_X_REF_DATA tag for the URI of the helper data file for one or more variant streams and downloads the helper data file associated with the content/chunk in step 44. Steps 42 and 44 can be accomplished in the background when trick play is desired, when switching to a new variant stream is needed, or before such events. For example, the client device may download the helper data file (i.e. steps 42 and 44) at the same time the playlist files and/or media files are downloaded. In this manner, the client device will have the information concerning key IDR reference frame offsets as well as size and timestamp before such information is needed.

During step 46, the client device downloads reference frames only using the size and position of the reference frames provided by the helper data file as discussed above. This enables the client device to preform trick plays in a quick and efficient manner without delay or error. This also enables the client device to quickly locate PTS aligned reference frames and perform switch and stitch operations between two variant streams at an intermediate point during the play duration of media data of a particular media file.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements.

The above referenced devices, servers, components, equipment, boxes, tuners and the like for carrying out the above methods can physically be provided on a circuit board or within another electronic device and can include various processors, microprocessors, controllers, chips, disk drives, and the like. It will be apparent to one of ordinary skill in the art that the processors, controllers, tuners, units, and the like may be implemented as electronic components, software, hardware or a combination of hardware and software. One of ordinary skill in the art appreciates that various modifications and changes can be made without departing from the scope of these embodiments as defined in the appended claims.

What is claimed is:

1. A method, comprising:
    downloading, by a client device, a playlist file for a multimedia presentation over a network from a streaming server using a transfer protocol, the playlist file including an ordered list of Universal Resource Indicators (URIs) for a plurality of media files, each of the plurality of media files including compressed video data corresponding to a segment of the multimedia presentation and containing reference frames;
    downloading, by the client device, a data file that is associated with the playlist file, the data file including, for each of a plurality of reference frames included in the respective media file from the plurality of media files, respective reference frame information indicating a respective location in the respective media file of the each of the plurality of reference frames;
    performing, responsive to a user request, a trick play related to a displaying of the multimedia presentation, using one or more reference frames from the plurality of reference frames;
    selecting, from a plurality of variant streams, a first variant stream for use in displaying the multimedia presentation; and
    reassembling segments included in the plurality of media files associated with the selected first variant stream of the plurality of variant streams to play the multimedia presentation as a continuous stream.

2. The method of claim 1, wherein the transfer protocol is Hypertext Transfer Protocol (HTTP) Live Streaming (HLS), and the downloading of the playlist file and the data file is performed by the client device electronically as HTTP fetches.

3. The method of claim 1, wherein each of the plurality of reference frames is an Instantaneous Decoder Refresh (IDR) frame within the compressed video data.

4. The method of claim 1, wherein the respective reference frame information includes a size and time stamp.

5. The method of claim 1, wherein the trick play is to fast forward through the multimedia presentation.

6. The method of claim 1, wherein the trick play is to fast reverse through the multimedia presentation.

7. The method of claim 1, wherein the trick play is to seek in the multimedia presentation.

8. The method of claim 1, wherein each of the plurality of variant streams includes an encoding of the multimedia presentation at a different bit rate and is associated with a respective data file.

9. The method of claim 8, further comprising:
    downloading at least subset of the plurality of media files associated with the selected first variant stream;
    selecting, from the plurality of variant streams, a second variant stream for displaying the multimedia presentation; and
    switching between the selected first variant stream and the second variant stream by aligning first reference frames of the selected first variant stream and second reference frames of the second variant stream based on respective time stamps of the first reference frames and the second reference frame, wherein the respective timestamps are included in a first data file associated with the selected first variant stream and a second data file associated with the second variant stream.

10. The method of claim 9, wherein the switching occurs at one reference frame of the second reference frames, wherein the one reference frame is located at an intermediate position within one of the reassembled segments during the displaying of the multimedia presentation.

11. A system for processing multimedia data streamed over a network, comprising a client device that includes a processor and a memory that stores instructions, that when executed by the processor causes the processor to:
- download, by the client device, a playlist file for a multimedia presentation over the network from a streaming server using a transfer protocol, the playlist file including an ordered list of Universal Resource Indicators (URIs) for a plurality of media files, each of the plurality of media files including compressed video data corresponding to a segment of the multimedia presentation and containing reference frames;
- download, by the client device, a data file that is associated with the playlist file, the data file including, for each of a plurality of reference frames included in the respective media file from the plurality of media files, respective reference frame information indicating a respective location in the respective media file of the each of the plurality of reference frames;
- perform, responsive to a user request, a trick play related to a displaying of the multimedia presentation, using one or more reference frames from the plurality of reference frames;
- select, from a plurality of variant streams, a first variant stream for use in displaying the multimedia presentation; and
- reassemble segments included in media files associated with a first variant stream of the plurality of variant streams to play the multimedia presentation as a continuous stream.

12. The system of claim 11, wherein the transfer protocol is Hypertext Transfer Protocol (HTTP) Live Streaming (HLS), and the downloading of the playlist file and the data file is performed by the client device electronically as HTTP fetches.

13. The system of claim 11, wherein each of the plurality of reference frames is an Instantaneous Decoder Refresh (IDR) frame within the compressed video data.

14. The system of claim 11, wherein the respective reference frame information includes a size and time stamp.

15. The system of claim 11, wherein the trick play is to fast forward through the multimedia presentation.

16. The system of claim 11, wherein the trick play is to fast reverse through the multimedia presentation.

17. The system of claim 11, wherein the trick play is to seek in the multimedia presentation.

18. The system of claim 11, wherein each of the plurality of variant streams includes an encoding of the multimedia presentation at a different bit rate and is associated with a respective data file.

19. A method comprising:
- downloading, by a client device, a playlist file for a multimedia presentation over a network from a streaming server using a transfer protocol, the playlist file including an ordered list of Universal Resource Indicators (URIs) for a plurality of media files, each of the plurality of media files including compressed video data corresponding to a segment of the multimedia presentation and containing reference frames;
- downloading, by the client device, a data file that is associated with the playlist file, the data file including, for each of a plurality of reference frames included in the respective media file from the plurality of media files, respective reference frame information indicating a respective location in the media file of the each of the plurality of the reference frames;
- performing, responsive to a user request, a trick play related to a displaying of the multimedia presentation, using one or more reference frames from the plurality of reference frames;
- selecting, from a plurality of variant streams, a first variant stream for use in displaying the multimedia presentation;
- reassembling segments included in the plurality of media files associated with the selected first variant stream to display the multimedia presentation as a continuous stream; and
- switching between the selected first variant stream and a second variant stream by aligning first reference frames of the selected first variant stream and second reference frames of the second variant stream based on respective time stamps of the first reference frames and the second reference frames, the respective timestamps being included in a first data file associated with the selected first variant stream and a second data file associated with the second variant stream.

20. The method of claim 19, wherein the switching occurs at a one reference frame of the first reference frames, wherein the one reference frame is located at an intermediate position within one of the reassembled segments during the displaying of the multimedia presentation.

* * * * *